(12) United States Patent
Sako

(10) Patent No.: US 10,940,926 B2
(45) Date of Patent: *Mar. 9, 2021

(54) FUEL CELL WATERCRAFT

(71) Applicant: Suzuki Motor Corporation, Hamamatsu (JP)

(72) Inventor: Kota Sako, Shizouka-ken (JP)

(73) Assignee: SUZUKI MOTOR CORPORATION

( * ) Notice: Subject to any disclaimer, the term of this patent is extended or adjusted under 35 U.S.C. 154(b) by 0 days.

This patent is subject to a terminal disclaimer.

(21) Appl. No.: 16/434,732

(22) Filed: Jun. 7, 2019

(65) Prior Publication Data

US 2019/0283852 A1 Sep. 19, 2019

Related U.S. Application Data

(63) Continuation of application No. 15/783,154, filed on Oct. 13, 2017, now Pat. No. 10,364,009.

(30) Foreign Application Priority Data

Dec. 5, 2016 (JP) .............................. JP2016-235933

(51) Int. Cl.
*B63H 20/00* (2006.01)
*H01M 16/00* (2006.01)
(Continued)

(52) U.S. Cl.
CPC .......... *B63H 20/00* (2013.01); *H01M 2/1072* (2013.01); *H01M 8/04089* (2013.01);
(Continued)

(58) Field of Classification Search
CPC ................ B63H 20/00; H01M 2/1072; H01M 8/04201; H01M 8/2475; H01M 8/04089;
(Continued)

(56) References Cited

U.S. PATENT DOCUMENTS 6,793,027 B1 9/2004 Yamada et al.
2006/0009092 A1 1/2006 Krietzman
(Continued)

FOREIGN PATENT DOCUMENTS

JP H09199152 A 7/1997
JP 2006056458 A 3/2006
(Continued)

OTHER PUBLICATIONS

Sako, Kota, U.S. Appl. No. 15/783,035, filed Oct. 13, 2017.

*Primary Examiner* — Anthony D Wiest
(74) *Attorney, Agent, or Firm* — Lerner, David, Littenberg, Krumholz & Mentlik, LLP

(57) ABSTRACT

A fuel cell watercraft includes: a hull; an electric motor Serving as a power source adapted to generate propulsion of the hull; a fuel cell unit adapted to supply electric power to the electric motor; a hydrogen fuel tank adapted to supply hydrogen fuel to the fuel cell unit; a secondary battery serving as an auxiliary power supply for the fuel cell unit; and power regulation means for regulating the electric power supplied to the electric motor, in which the hull includes first and second storage spaces isolated from each other, the first and second storage spaces include equipment hatches able to be opened and closed by lid members, the fuel cell unit and the hydrogen fuel tank are housed in the first storage space, and the secondary battery and the power regulation means are housed in the second storage space.

2 Claims, 1 Drawing Sheet

(51) Int. Cl.
  *H02P 29/40* (2016.01)
  *H01M 8/04082* (2016.01)
  *H01M 8/0444* (2016.01)
  *H01M 10/0525* (2010.01)
  *H01M 8/04746* (2016.01)
  *H01M 2/10* (2006.01)
  *H01M 8/0662* (2016.01)
  *H01M 8/2475* (2016.01)
  *H01M 8/04089* (2016.01)

(52) U.S. Cl.
  CPC ... *H01M 8/04201* (2013.01); *H01M 8/04216* (2013.01); *H01M 8/04455* (2013.01); *H01M 8/04753* (2013.01); *H01M 8/0687* (2013.01); *H01M 8/2475* (2013.01); *H01M 10/0525* (2013.01); *H01M 16/006* (2013.01); *H02P 29/40* (2016.02); *H01M 2220/20* (2013.01); *H01M 2250/20* (2013.01); *Y02T 90/40* (2013.01)

(58) Field of Classification Search
  CPC ........... H01M 8/0687; H01M 8/04753; H01M 8/04216; H01M 8/04455; H01M 10/0525; H01M 2220/20; H01M 16/006; H01M 2250/20; H02P 29/40; B63B 2755/00
  USPC .................................. 440/3, 6; 429/452, 469
  See application file for complete search history.

(56) References Cited

U.S. PATENT DOCUMENTS

| | | |
|---|---|---|
| 2006/0040573 A1 | 2/2006 | Kobayashi et al. |
| 2007/0122667 A1 | 5/2007 | Kelley |
| 2007/0138006 A1 | 6/2007 | Oakes et al. |
| 2008/0156549 A1* | 7/2008 | Leboe ............... H01M 8/04559 180/65.1 |
| 2010/0248562 A1 | 9/2010 | Daikoku |
| 2010/0266911 A1 | 10/2010 | Aso |
| 2010/0304228 A1 | 12/2010 | Majarov et al. |
| 2011/0048308 A1 | 3/2011 | Tarkovacs |
| 2011/0233996 A1 | 9/2011 | Kato et al. |
| 2013/0244125 A1 | 9/2013 | Wake et al. |
| 2014/0322623 A1 | 10/2014 | Ohgami et al. |
| 2015/0111116 A1 | 4/2015 | Hotta et al. |
| 2016/0159492 A1* | 6/2016 | Filangi, Jr. .......... H01M 8/2475 244/58 |
| 2018/0154996 A1 | 6/2018 | Sako |

FOREIGN PATENT DOCUMENTS

| | | |
|---|---|---|
| JP | 2010062004 A | 3/2010 |
| JP | 2010228558 A | 10/2010 |
| JP | 2015196407 A | 11/2015 |
| JP | 2015196408 A | 11/2015 |
| JP | 2016080328 A | 5/2016 |

* cited by examiner

FUEL CELL WATERCRAFT

CROSS-REFERENCE TO RELATED APPLICATIONS

The present application is a continuation of U.S. patent application Ser. No. 15/783,154, filed on Oct. 13, 2017, which claims priority from Japanese Patent Application No. 2016-235933, all of which are incorporated herein by reference.

FIELD OF THE INVENTION

The present invention relates to a fuel cell watercraft.

BACKGROUND

Fuel cells have been considered for use as a power supply for an electric outboard motor. For example, Patent Literature 1 discloses a fuel cell watercraft which carries a fuel tank and battery inside a hull and houses a fuel cell and electric motor in a case of an outboard motor (FIG. 5).

Patent Literature 1 also discloses a fuel cell watercraft which carries a fuel cell together with a fuel tank and battery inside a hull (FIG. 2).

[Patent Literature 1] JP 2015-196407 A

However, in a structure described in FIG. 5 of Patent Literature 1, the fuel cell (power generator) is larger than an electric motor commonly mounted on an outboard motor, and has to be connected with the fuel tank in the hull as well via piping used to supply hydrogen fuel, and thus, this layout cannot be said to be practical.

Also, a structure described in FIG. 2 of Patent Literature 1, assumes installation in an enclosed space by taking effects of salt damage, rainfall, and the like into consideration. However, the fuel cell, which needs periodic hydrogen purging, may come into contact with purged hydrogen gas, and if an electric sparks occur when the fuel cell is installed together with a battery or a DC/DC converter, there remains a safety problem.

BRIEF SUMMARY OF THE INVENTION

The present invention has been made in view of the above problem with the conventional technique and has as an object to provide a fuel cell watercraft with improved space efficiency, weather resistance, and safety.

To solve the above problem, the present invention provides a fuel cell watercraft comprising: hull (10); an electric motor (6) serving as a power source adapted to generate propulsion of the hull; a fuel cell unit (2) adapted to supply electric power to the electric motor; a hydrogen fuel tank (3) adapted to supply hydrogen fuel to the fuel cell unit; a secondary battery (4) serving as an auxiliary power supply for the fuel cell unit; and power regulation means (5) for regulating the electric power supplied to the electric motor, in which the hull (10) includes first and second storage spaces (11 and 12) isolated from each other, wherein the first and second storage spaces include equipment hatches (11c and 12c) able to be opened and closed by lid members (11b and 12b), the fuel cell unit (2) and the hydrogen fuel tank (3) are housed in the first storage space (11), and the secondary battery (4) and the power regulation means (5) are housed in the second storage space (12).

Advantages of the Invention

With the above configuration, the fuel cell watercraft according to the present invention has the following advantages.

Since the hydrogen-related equipment (fuel cell unit and hydrogen fuel tank) and the other electrical equipment (secondary battery and power regulation means) are housed separately in the first and second storage spaces isolated from each other, even if electric sparks occur in the electrical equipment, contact with hydrogen gas purged in the first storage space can be avoided.

Also, because the first storage space adapted to house the hydrogen-related equipment and the second storage space adapted to house the other electrical equipment can both be operated in a state of being closed by the opening/closing means such as the lid members, the fuel cell watercraft has good weather resistance and is advantageous in preventing flooding caused by rainfall or waves as well as preventing salt damage.

Furthermore, by separately housing the hydrogen-related equipment and the other electrical equipment, all pieces of power supply equipment can be housed in the two storage spaces, and thus, the present configuration excels in space efficiency and is advantageous in considering weight distribution of the hull; and in addition, existing housing space in the hull, such as a fish pen, can be utilized, which is advantageous in reducing cost involved in retrofitting the present configuration into an existing hull.

MODE FOR CARRYING OUT THE INVENTION

An embodiment of the present invention will be described in detail below with reference to the accompanying drawings.

Figure 1:
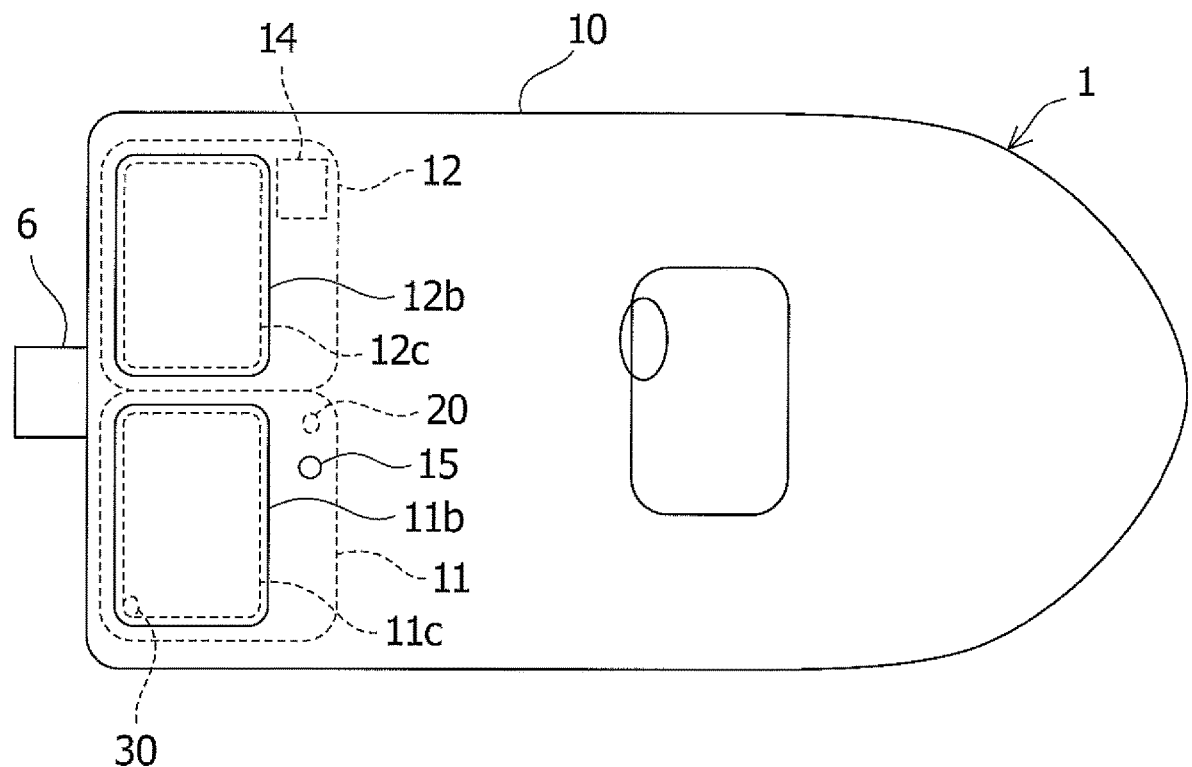
FIG. 1 is a plan view showing a fuel cell watercraft according to an embodiment of the present invention.

Referring to FIG. 1, in a fuel cell watercraft 1 according to the embodiment of the present invention, an electric outboard motor 6 equipped with a propeller and electric motor for use to provide propulsion is mounted steerably in rear part of a hull 10, and hydrogen-related equipment and electrical equipment making up a fuel cell system adapted to supply electric power to the electric outboard motor 6 are split off and housed separately in two storage spaces 11 and 12 installed side by side in the rear part of the hull 10.

The storage spaces 11 and 12 are provided with respective equipment and maintenance hatches 11c and 12c in a deck on the hull and equipped with lid members 11b and 12b (hatch covers) for use to tightly close the respective hatches 11c and 12c. As shown in FIG. 1, the storage spaces 11 and 12 are each shaped like a sac expanded under the deck on the hull to avoid excessive size increase of the hatches 11c and 12c while securing sufficient housing space.

Figure 2:
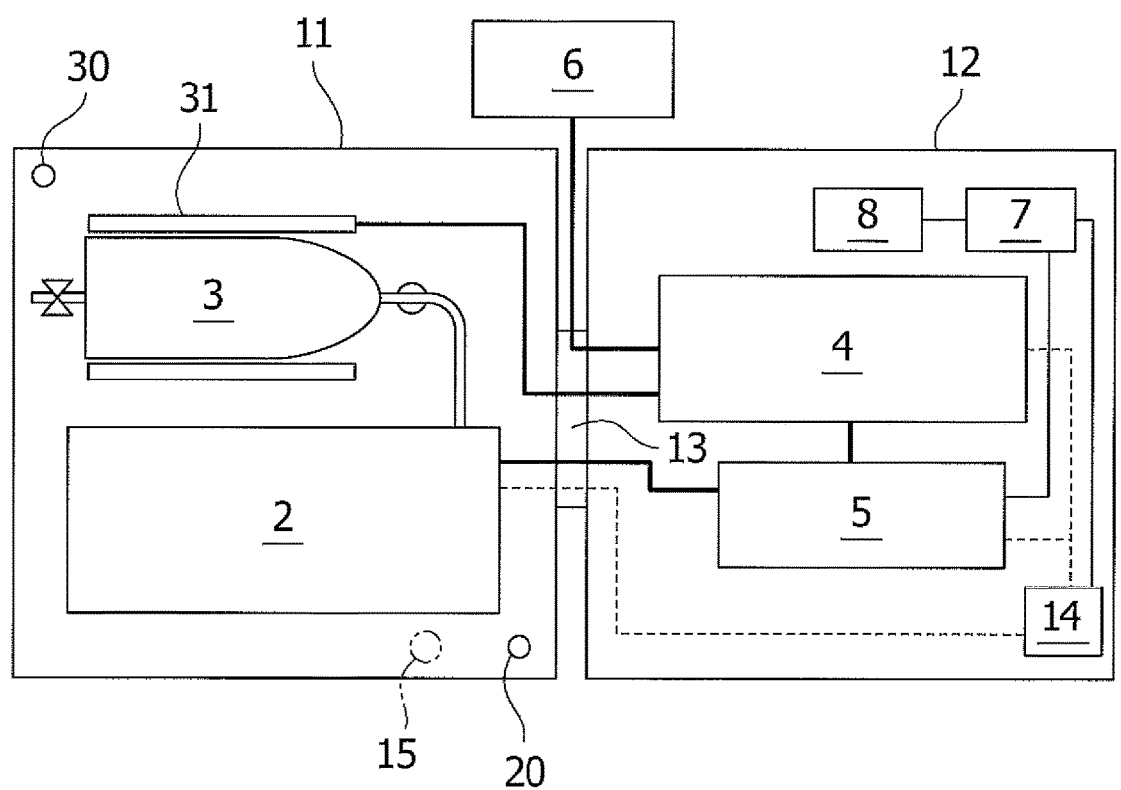
FIG. 2 is a plan view of a principal part showing storage spaces of the fuel cell watercraft according to the embodiment of the present invention.

Although the storage spaces 11 and 12 are isolated from each other, a communicating portion 13 for wiring is open by penetrating adjacent side walls as shown in FIG. 2 when equipment is carried in, and the communicating portion 13 is sealed by a sealing material or the like after the equipment carry-in and wiring is completed. Note that when the storage spaces 11 and 12 are placed, being spaced away from each other, the communicating portion 13 is provided as a duct adapted to connect the storage spaces 11 and 12 with each other.

As shown in FIG. 2, according to the present embodiment, hydrogen-related equipment is housed in the first storage space 11 on a right side of the hull, including a fuel cell unit 2 as a power generator serving as a main source of power supply to the electric outboard motor 6 and a hydrogen fuel tank 3 used to supply hydrogen fuel to the fuel cell unit 2.

The fuel cell unit 2, which includes a fuel-cell stack in which a large number of cells each made up of a fuel electrode and air electrode placed across an electrolyte membrane are stacked via separators defining flow paths adapted to supply fuel (hydrogen) and an oxidizer (atmospheric oxygen) to the cells as well as a fuel-side header, an air-side header, a compressor, a controller, and the like, is a power generator adapted to extract electric power from chemical energy of hydrogen fuel using an electrochemical reaction and is provided with a cooling fan to dissipate heat of the reaction.

The hydrogen fuel tank 3 can be a high-pressure hydrogen tank or low-pressure hydrogen tank adapted to store hydrogen directly as gas, but preferably is a hydrogen storing alloy tank containing a hydrogen storing alloy capable of storing and releasing hydrogen in a molecular state inside a container. The metal species of the storing alloy is not particularly limited, but preferably is such as to be able to release hydrogen at as low a temperature as possible and at as low a pressure as possible.

A supply pipe adapted to supply hydrogen fuel to the fuel cell unit 2 is connected to one end of the hydrogen fuel tank 3, and a safety valve (relief valve) for use to discharge hydrogen in an emergency is installed at another end. A heater 31 is installed around the hydrogen fuel tank 3 to facilitate hydrogen release from the storing alloy in the tank by heating. As the heater 31, a resistance heating element or electric heater adapted to generate heat by the passage of electric current is used preferably.

Note that when a high-pressure hydrogen tank is used as the hydrogen fuel tank 3, no heater is required, but a regulator (pressure reducing valve) is installed on the supply pipe instead. Also, the high-pressure hydrogen tank is basically unremovable, which requires a mechanism for filling the tank at a gasoline station or the like.

On the other hand, the second storage space 12 on a left side of the hull houses electrical equipment such as a secondary battery 4 as an auxiliary power supply, a converter 5 as power regulation means, step-down converter 7, a low-voltage secondary battery 8, and a control device 14.

The secondary battery 4 is installed to enable stable driving of the electric outboard motor 6 by being charged beforehand with electricity generated by the fuel cell unit 2 and feeding electricity form the secondary battery 4 to a motor of the electric outboard motor 6 and thereby make up for characteristics of the fuel cell unit 2 whose power generation capacity falls at startup; and a lithium ion battery (LIB) or the like is preferable.

The converter 5 is an HVDC/DC converter used to adjust voltages of the fuel cell unit 2 and the secondary battery 4. The present embodiment uses a step-down type adapted to step down an output voltage (approximately 100 V) of the fuel cell unit 2 to the voltage (48 V) of the secondary battery 4 and stably supply electric power from the secondary battery 4 to the electric outboard motor 6 as described above, but when high output is required, a step-up type adapted to supply the voltage of the fuel cell unit 2 or secondary battery 4 to the electric outboard motor 6 by converting the voltage into a high voltage may be used.

The step-down converter 7 is a 12-V DC/DC converter used to convert part of the electric power of the fuel cell unit 2 and/or secondary battery 4 into a low voltage (12 V), and the resulting electric power is accumulated in the low-voltage secondary battery 8 (12-V battery) and supplied to auxiliary equipment including a compressor (blower), a solenoid valve, a cooling fan, and a controller attached to the fuel cell unit 2 as well as supplied to the control device 14.

After the hydrogen-related equipment and electrical equipment are carried separately into the storage spaces 11 and 12, respectively as described above, an output side of the fuel cell unit 2 is connected to an input side (primary side) of the converter 5 via wiring inserted through the communicating portion 13 in the center and the secondary battery 4 is connected to an output side (secondary side) of the converter 5. Also, the heater 31 of the hydrogen fuel tank 3 is connected to the secondary battery 4 via wiring inserted through the communicating portion 13 in the center to supply electric power from the secondary battery 4 to the heater 31.

The communicating portion 13 is sealed by a sealing material or the like after completion of all the wiring as already described earlier, and as shown in FIG. 2, since the wiring adapted to supply electric power to the electric outboard motor 6 is routed through the communicating portion 13 between the two storage spaces 11 and 12, there is no need to form a through-hole in either of the storage spaces 11 and 12 separately and sealing the through-hole after wiring.

The fuel cell watercraft 1 configured as described above navigates with the respective hatches 11*c* and 12*c* of the storage spaces 11 and 12 closed by the lid members 11*b* and 12*b*. In so doing, as the fuel cell unit 2 generates power, oxygen in the first storage space 11 is consumed, and oxygen concentration in the first storage space 11 decreases accordingly. Thus, an outside-air introduction passage 15 is provided in the first storage space 11 to introduce outside air through a filter.

Preferably, the outside-air introduction passage 15 has a trap structure to prevent water intrusion caused by rainfall or waves and a waterproof filter is used. Furthermore, when sea use or inshore use is expected, preferably a salt-resistant filter is used to prevent salt damage.

The outside-air introduction passage 15 such as described above can prevent decreases in the oxygen concentration, but to reduce filter replacement frequency and improve water resistance and salt tolerance performance, it is possible to install an oxygen concentration sensor 20 inside the first storage space 11, install a shutter (opening and closing means) for use to open and close the outside-air introduction passage 15, open and close the shutter only when the oxygen concentration falls to or below a threshold, and thereby introduce outside air through the outside-air introduction passage 15 via a filter.

With this configuration, a detection value of the oxygen concentration sensor 20 is sent to the control device 14 and compared with a set value, and if the detection value is equal to or lower than the set value, a non-illustrated actuator (solenoid) or the like performs a shutter opening/closing action. Note that by installing a timer on the control device 14 instead of installing the oxygen concentration sensor 20, the control device 14 may be configured to measure an operating duration of the fuel cell unit 2 and perform a shutter opening and closing action at predetermined time intervals.

In the fuel cell watercraft 1 according to the present invention, since the hydrogen-related equipment and electrical equipment are housed in the storage spaces 11 and 12 isolated from each other, even if electric sparks occur in the second storage space 12 housing the electrical equipment with purged hydrogen gas staying in the first storage space 11, the electric sparks do not come into contact with the hydrogen gas. Therefore, a hydrogen purge is carried out at predetermined time intervals during operation of the fuel cell unit 2, and there is no immediate problem even if hydrogen gas stays in the first storage space 11, and desirably, hydrogen gas does not remain.

In this case, since outside air is introduced through the outside-air introduction passage 15 by the above-mentioned shutter opening and closing action at predetermined time intervals, hydrogen gas is discharged by being diluted further. Alternatively, by installing a hydrogen sensor 30 in the first storage space 11, hydrogen gas may be set to be discharged by opening the shutter of the outside-air introduction passage 15, described earlier, when the hydrogen gas concentration in the first storage space 11 reaches or exceeds a set value.

Note that although a case in which the first and second storage spaces 11 and 12 are installed on left and right sides in the rear part of the hull 10 has been described in the above embodiment, the first and second storage spaces 11 and 12 may be installed one behind the other in a longitudinal direction of the hull 10. In that case, by taking weight balance into consideration, preferably the first and second storage spaces 11 and 12 are installed one behind the other in the longitudinal direction in a center of the hull 10.

Also, either one or both of the first and second storage spaces 11 and 12 may be made up of plural storage spaces, and in that case, the first storage space group adapted to house the hydrogen-related equipment and the second storage space group adapted to house the electrical equipment need to be isolated from each other.

Also, existing storage spaces (deck storage, fish pen, and the like) provided in the hull can be utilized as the first and second storage spaces 11 and 12 or there may be a case in which either one or both are installed separately from the existing storage spaces.

Also, as the first and second storage spaces 11 and 12, a single storage space may be used by being partitioned into two storage spaces by a partition member such as a partition wall or partition plate. In that case, it is necessary to seal peripheries of the partition member by a sealing material or the like such that the two storage spaces will be isolated from each other when hatches are closed and ensure that hydrogen gas is discharged in advance when the hatches are opened for maintenance or the like.

Furthermore, although a case in which the openable/closable lid members 11b and 12b (hatch covers) are installed on the hatches 11c and 12c has been described in the above embodiment, lid members available for use as the lid members 11b and 12b include not only lid members made of a rigid material, such as hatch covers which can be opened and closed using a hinge or slider and hatch covers which can be opened and closed by being attached and detached using fastening means such as a screw or using tightening means such as a clamp, but also lid members made of a flexible sheet material.

In the latter case, a fastener (slide fastener, hook and loop fastener, rail fastener, airtight fastener, or the like) which can be opened and closed is provided between peripheral edges of the lid members and edges of the hatches. Such flexible lid members may be installed on an inner side of the lid members made of a rigid material, and in that case, the flexible lid members may be installed integrally with a bag (or a case) defining an enclosed space in either one or both of the storage spaces.

Although a case in which DC/DC converters (converter 5 and step-down converter 7) are used as power regulation means housed in the second storage space 12 has been described in the above embodiment, an inverter (when an AC motor is used for the electric outboard motor 6) or a breaker may be included.

Also, although a case in which an air-cooled fuel cell unit is used has been described in the above embodiment, the present invention is also applicable to a fuel cell watercraft carrying a liquid-cooled fuel cell unit.

Whereas some embodiments of the present invention have been described above, the present invention is not limited to these embodiments, and various modifications and changes can be made based on the technical idea of the present invention.

1 Fuel cell watercraft
2 Fuel cell unit
3 Hydrogen fuel tank
4 Secondary battery (lithium ion battery)
5 Converter (HVDC/DC converter)
6 Electric outboard motor
7 Step-down converter (12-V DC/DC converter)
8 Secondary battery (12-V battery)
10 Hull
11 First storage space
11b, 12b Lid member (hatch cover)
11c, 12c Hatch
12 Second storage space
13 Communicating portion
14 Control device
15 Outside-air introduction passage (filter)
20 Oxygen concentration sensor
30 Hydrogen sensor
31 Heater

The invention claimed is:
1. A fuel cell watercraft comprising:
a hull having a deck;
an electric motor serving as a power source adapted to generate propulsion for the hull;
a fuel cell unit adapted to generate electric power to be supplied to the electric motor;
a hydrogen fuel tank adapted to supply hydrogen fuel to the fuel cell unit;
a secondary battery serving as an auxiliary power supply for the fuel cell unit; and
power regulation means for regulating the electric power to be supplied to the electric motor,
wherein the hull has first and second storage spaces adjacent right and left inside a rear part of the hull and isolated from each other, the first and second storage spaces are respectively provided with equipment hatches able to be opened through the deck and closed by lid members, the fuel cell unit and the hydrogen fuel tank are housed in the first storage space, and the secondary battery and the power regulation means are housed in the second storage space, and
wherein a communicating portion is provided between the first storage portion and the second storage portion penetrating adjacent side walls thereof such that the fuel cell unit is connected to at least one of the secondary battery or the power regulation means housed in the second storage portion via wiring inserted through the communicating portion, and a wiring for supplying electric power to the electric motor is routed through the communicating portion between the first storage portion and the second storage portion, and the communicating portion is sealed around the wiring.
2. The fuel cell watercraft according to claim 1, wherein the electric motor is provided as an electric outboard motor mounted steerably in a center of the rear part of the hull, and the communicating portion is located in a center of a width of the hull.

\* \* \* \* \*